(12) United States Patent
Glenn

(10) Patent No.: US 12,026,915 B2
(45) Date of Patent: Jul. 2, 2024

(54) ENHANCED MEASUREMENT OF PHOTOSYNTHETICALLY ACTIVE RADIATION (PAR) AND IMAGE CONVERSION THEREFOR

(71) Applicant: PRECISION SILVER LLC, Gainesville, FL (US)

(72) Inventor: Taylor Courtland Glenn, Gainesville, FL (US)

(*) Notice: Subject to any disclaimer, the term of this patent is extended or adjusted under 35 U.S.C. 154(b) by 378 days.

(21) Appl. No.: 17/620,518

(22) PCT Filed: Jun. 17, 2020

(86) PCT No.: PCT/US2020/038089
§ 371 (c)(1),
(2) Date: Dec. 17, 2021

(87) PCT Pub. No.: WO2020/257252
PCT Pub. Date: Dec. 24, 2020

(65) Prior Publication Data
US 2022/0319048 A1    Oct. 6, 2022

Related U.S. Application Data

(60) Provisional application No. 62/863,022, filed on Jun. 18, 2019.

(51) Int. Cl.
*G06T 7/80* (2017.01)
*G01N 21/27* (2006.01)
*A01C 21/00* (2006.01)

(52) U.S. Cl.
CPC .......... *G06T 7/80* (2017.01); *G01N 21/276* (2013.01); *A01C 21/005* (2013.01); *G06T 2207/10036* (2013.01); *G06T 2207/30188* (2013.01)

(58) Field of Classification Search
None
See application file for complete search history.

(56) References Cited

U.S. PATENT DOCUMENTS

| 10,386,296 B1* | 8/2019 | Wolf ................ G01N 21/35 |
| 2011/0101239 A1 | 5/2011 | Woodhouse et al. |

(Continued)

FOREIGN PATENT DOCUMENTS

| WO | 2018009967 A1 | 1/2018 | |
| WO | 2019025317 A1 | 2/2019 | |
| WO | WO-2020208633 A1 * | 10/2020 | ............ A01C 21/00 |

OTHER PUBLICATIONS

International Search Report and Written Opinion issued in International Application No. PCT/US2020/038089, dated Oct. 26, 2020, 12 pages.

(Continued)

*Primary Examiner* — Vikkram Bali
(74) *Attorney, Agent, or Firm* — Talem IP Law, LLP

(57) ABSTRACT

A method for measuring photosynthetically active radiation (PAR), and particularly fraction-absorbed PAR (faPAR) measurements, which shows a relationship between how much energy is available compared with how much energy is actually used, or absorbed, by plants in a region of interest, can include calibrating multiband image data to generate reflectance-calibrated values for each band of the multiband image data. The weighted reflectance data of the bands can be combined, along with down-welling light data captured at the time of the multi-spectral images to generate a faPAR image. In some cases, faPAR is generated using a ratio of up-welling PAR (uPAR) to down-welling PAR (dPAR). The dPAR can be generated using partially-reflectance-calibrated data and fully-reflectance-calibrated data and the uPAR can be generated using the partially-reflectance-calibrated data.

6 Claims, 13 Drawing Sheets

(56) References Cited

U.S. PATENT DOCUMENTS

2017/0195605 A1    7/2017   Alves
2017/0345208 A1   11/2017   Ashdown et al.
2018/0010963 A1    1/2018   Wolf et al.
2018/0313760 A1   11/2018   Kramer et al.

OTHER PUBLICATIONS

Shunlin Liang et al. "Estimation of incident photosynthetically active radiation from Moderate Resolution Imaging Spectrometer data" Journal of Geophysical Research, Aug. 8, 2006, 13 pages, vol. 111.

* cited by examiner

ENHANCED MEASUREMENT OF PHOTOSYNTHETICALLY ACTIVE RADIATION (PAR) AND IMAGE CONVERSION THEREFOR

CROSS-REFERENCE TO RELATED APPLICATIONS

This application is the U.S. National Stage Application of International Application No. PCT/US20/38089, filed Jun. 17, 2020, which claims the benefit of U.S. Provisional Patent Application Ser. No. 62/863,022, filed Jun. 18, 2019, which are hereby incorporated by reference in their entirety.

BACKGROUND

In the field of agricultural science, it is desirable to know the amount of light energy available to plants for photosynthesis. Photosynthesis can occur when plants receive solar radiation in wavelengths between 400-700 nm. The energy available for photosynthesis is called photosynthetically active radiation (PAR). The intensity of PAR affects the rate of photosynthesis. For example, the higher the PAR value, the greater the rate of photosynthesis. Knowing the available energy, or PAR, can help farmers and scientists determine optimal planting locations based on the needs of different plant types.

Another useful measurement is the fraction-absorbed PAR (faPAR), which is a ratio that measures how much available light is actually absorbed by plants. PAR and faPAR can be measured in a variety of ways. Often, a sensor—held by hand—is aimed upward to measure the amount of light emitted from the sun in the photosynthetic region of 400-700 nm. The sensor is then aimed downward towards the region of interest to measure the amount of light radiating off the plants in that region. The ratio of the amount of light emitted from the sun compared to the amount of light radiating off the plants can indicate how much energy was absorbed by the plants, or perhaps the ground, in a region of interest.

BRIEF SUMMARY

Methods for measuring photosynthetically active radiation (PAR) from imaging sensors with coupled down-welling light sensors and image conversion therefor are described herein.

Scientists and farmers use several types of PAR measurements to determine certain characteristics of a region of interest, including down-welling PAR (dPAR), up-welling PAR (uPAR), and faPAR. In general terms, the dPAR is the amount of solar energy available to plants for photosynthesis and the uPAR is the amount of energy reflected back from plants and not used for photosynthesis. The two values, dPAR and uPAR can be used to determine a ratio, called fraction-absorbed PAR (faPAR). faPAR is a particularly useful value as it shows a relationship between how much energy is available compared with how much energy is actually used, or absorbed, by plants in a region of interest.

The described methods can be carried out by an image conversion system as described herein on images taken of a region of interest and the results can be provided in a viewer, which can apply various color mappings indicating the corresponding values of dPAR, uPAR, and faPAR for selected regions of the images.

In some cases, when an image that was taken using an imaging sensor with a coupled down-welling light sensor is displayed via a viewer supported by the described image conversion system, certain tools can be provided such that a user can select a region within the image to obtain an average value for dPAR, uPAR, and/or faPAR for that region. In some cases, the selected region can be all pixels corresponding to vegetation canopy. In some cases, the selected region can be the pixels corresponding to vegetation canopy within a selected area of the image. In some cases, the selected region can be all pixels within a selected area.

In some cases, for certain images taken using imaging sensors with a coupled down-welling light sensor, multiple spectral bands are obtained of the region of interest to capture the 400-700 nm range of applicable wavelengths in the images. In some cases, when multiple spectral bands are captured for the 400-700 nm wavelengths, a method for generating a faPAR image can include calibrating the raw multiband image data to generate calibrated values for each band of the multiband image data. The calibration can be carried out to generate partially-reflectance-calibrated and fully-reflectance-calibrated values for each band of the multiband image data. Weights can be assigned to each band that scale measurements from that band in proportion to that band's contribution to PAR and to the desired output units. A faPAR image can be generated using the weighting factors, the multiband reflectance data, and the down-welling light data captured at the time of the of the multi-spectral images. For example, the weights can be assigned to the reflectance data of each band to generate a weighted reflectance data of each band and combined along with certain irradiance values, including downwelling irradiance values, to obtain radiation values that cover an entire band of the multiband image data. The faPAR image can be generated from the radiation values. In some cases, faPAR is generated using a ratio of up-welling PAR (uPAR) to down-welling PAR (dPAR). In conjunction with the calibration image's downwelling irradiance values, the dPAR can be generated using partially-reflectance-calibrated data and fully-reflectance-calibrated data and the uPAR can be generated using the partially-reflectance-calibrated data.

In some cases, a method for measuring PAR can include receiving image data covering between 400-700 nm wavelengths using at least one spectral band. The image data can be from a remote imaging of a region of interest (e.g., via drone). A partial calibration can be performed using the image data and a calibration image to generate a partially-reflectance-calibrated data; and a full calibration can be performed using the image data, the calibration image, and down-welling data to generate a fully-reflectance-calibrated data. The calibration image can be an image of an object with a known reflectance value. A dPAR image can be generated from at least the partially-reflectance-calibrated data, the fully-reflectance-calibrated data, and the down-welling data corresponding to the calibration image. A uPAR image can be generated from at least the partially-reflectance-calibrated data, and the down-welling data corresponding to the calibration image. Finally, a faPAR image can be generated using a ratio of uPAR to dPAR.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Methods for measuring photosynthetically active radiation (PAR) from imaging sensors with coupled down-welling light sensors and image conversion therefor are described herein. The described methods can be carried out by an image conversion system as described herein on images taken of a region of interest and the results can be provided in a viewer, which can apply various color mappings indicating the corresponding values of dPAR, uPAR, and faPAR for selected regions of the images.

In some cases, for certain images taken using imaging sensors with a coupled down-welling light sensor, multiple spectral bands are obtained of the region of interest to capture the 400-700 nm range of applicable wavelengths in the images, and the image data from each of these spectral bands is converted to reflectance data, which can take into consideration downwelling light data, and then weighted and combined to generate faPAR data.

Knowing the amount of light plants absorb for photosynthesis can be useful to farmers and scientists in determining optimal planting in an area. Existing systems for measuring the amount of available light energy for photosynthesis (e.g., for the measurement of PAR) are typically based on broadband photodiodes which measure the amount of light coming in at a single point. The same photodiode can then be flipped around to measure the amount of light coming back from a region of interest, such as single plant or group of neighboring plants within a field. The result is a single area measured at a time. If an entire field of plants is to be measured, a single measurement at a single point can be made at a time before moving to the next point. This process can be slow and tedious. Meanwhile, the environment may change due to factors such as sunlight and temperature fluctuations. These fluctuations can cause plants to absorb or release varying amounts of energy. Therefore, it is desirable to perform all measurements as close in time as possible.

To obtain data on a larger area region of interest, a remote sensing platform can be used. Remote sensing refers to sensing that does not directly touch the object of measure. Aerial imagery and satellite imagery are among several common remote sensing platforms. Remote sensing may also include RADAR and LIDAR systems. However, platforms that are too far removed from the area of interest may not provide accurate results. For example, a remote sensing satellite may encounter cloud cover or atmospheric scattering during transmissions. Additionally, satellite platforms may have low resolution and may be able to view changes in PAR over an entire field, but not at an individual plant level. In some cases, it may be advantageous to measure PAR at a plant level in order to compare a plant treated with chemical X versus a plant treated with chemical Y (where X and Y represent different chemicals).

Figure 1:
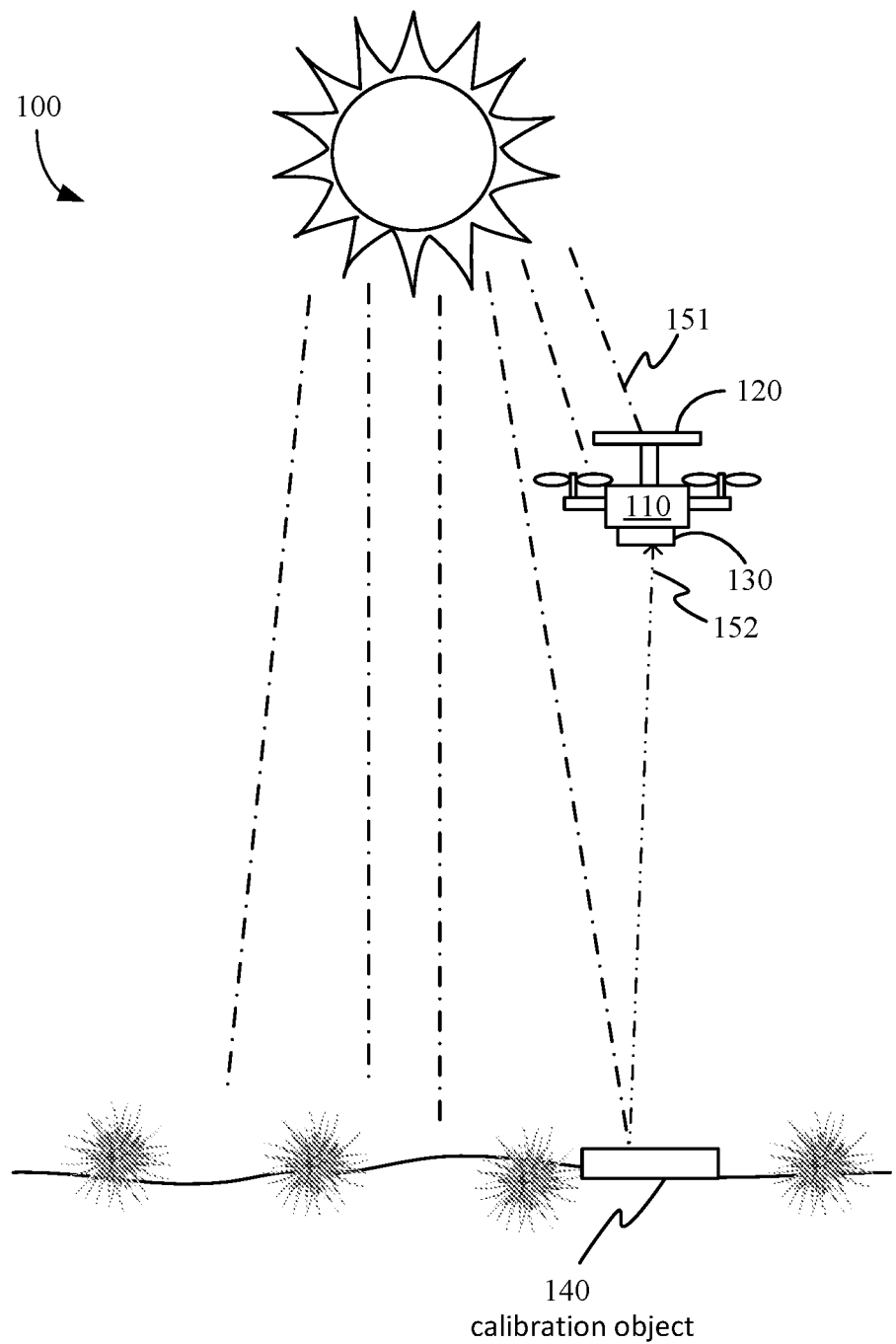
FIG. 1 shows an example implementation of a remote sensing environment that may be used to gather image data used by the described systems and methods.

FIG. 1 shows an example implementation of a remote sensing environment that may be used to gather image data used by the described systems and methods. The remote sensing environment 100 can include an imaging platform 110 with a down-welling light sensor 120 mounted on top, a camera 130 mounted on the underside, and a reflectance calibration object 140 positioned within the region of interest. The imaging platform 110 may be, for example, an unmanned aerial vehicle (UAV), ground vehicle, or handheld device. An example of a UAV may be a multi-rotor helicopter drone.

The down-welling light sensor 120 measures the amount of light available to plants for photosynthesis in the 400-700 nm wavelengths range. The down-welling light sensor 120 can be any commercially available sensor. The camera 130 can be a multi-spectral camera and may be any commercially available camera. The camera 130 and the down-welling light sensor 120 can be coupled, e.g., synchronized in time together, such that a down-welling value (from impinging light 151) captured at a certain time by the down-welling light sensor can be co-registered with a corresponding up-welling value (from light including reflected light 152) captured by the camera at that same time. The coupling/co-registration may occur via a data storage manager at the remote sensing platform or later coupled/co-registered once the image data has been received by the described systems and methods for measuring PAR.

The reflectance calibration object 140 may be an object placed amongst plantings in a region of interest. The reflectance calibration object is an object that has known reflectance values. The reflectance values of the reflectance calibration object can be measured in a laboratory environment or another controlled environment using a spectrometer. For example, a calibration object may be a commercially available photographic light meter/white balance panel or calibration card cards with, for example, three different reflectance values, or reflectance levels. A laboratory spectrometer may be used to measure the precise reflectance curve for each panel. These known reflectance values can be used to calibrate the remote sensing environment 100. By assuming black has zero reflectance, at minimum one additional reflectance level is needed for calibration. Any object can be used as a calibration object if the reflectance curve is known.

Reflectance calibration of the remote sensing environment enables accurate reflectance measurements which lead to accurate PAR measurements. Relevant reflectance levels of the calibration target must be chosen to match the environment to match the expected exposure. For example, in some cases, a camera may only expose images within a certain region so that a dark region may be washed out too low, or a bright region may be saturated.

In the example implementation of FIG. 1, the imaging platform 110 is a drone that flies over a region of interest to capture image data using the camera 130. The camera 130 can capture a single picture, or a series of pictures. The number of pictures captured is dependent on several factors, such as the size of the region of interest, the altitude of the drone implementing the imaging platform 110, and the characteristics of the particular camera 130, such as field of view. The image data from the camera 130 is of the area of interest. The number of images that are taken is based on the ability of the camera to capture an image of the area that needs to be covered while still providing a desired resolution. For example, it may be desirable to have a resolution such that a pixel can correspond to an area of 2 cm². When multiple images are taken in order to cover the area of interest, such as a field, the images can be stitched together using any suitable program. For example, photogrammetry software programs are available for stitching together images obtained via cameras on drones. The stitched together images can be referred to as a mosaic image.

Figure 2:
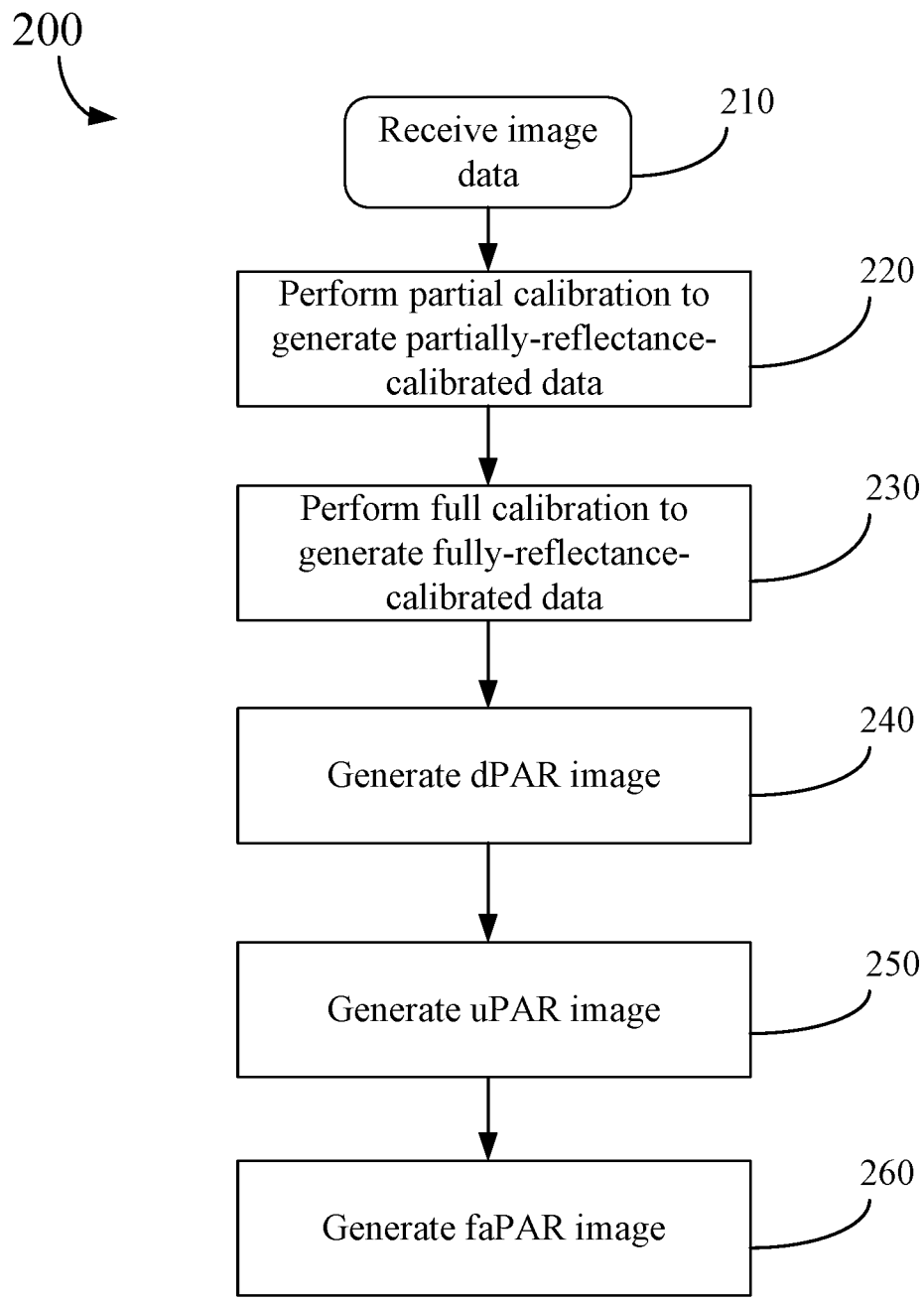
FIG. 2 shows a method for generating a PAR image.
Figure 3:
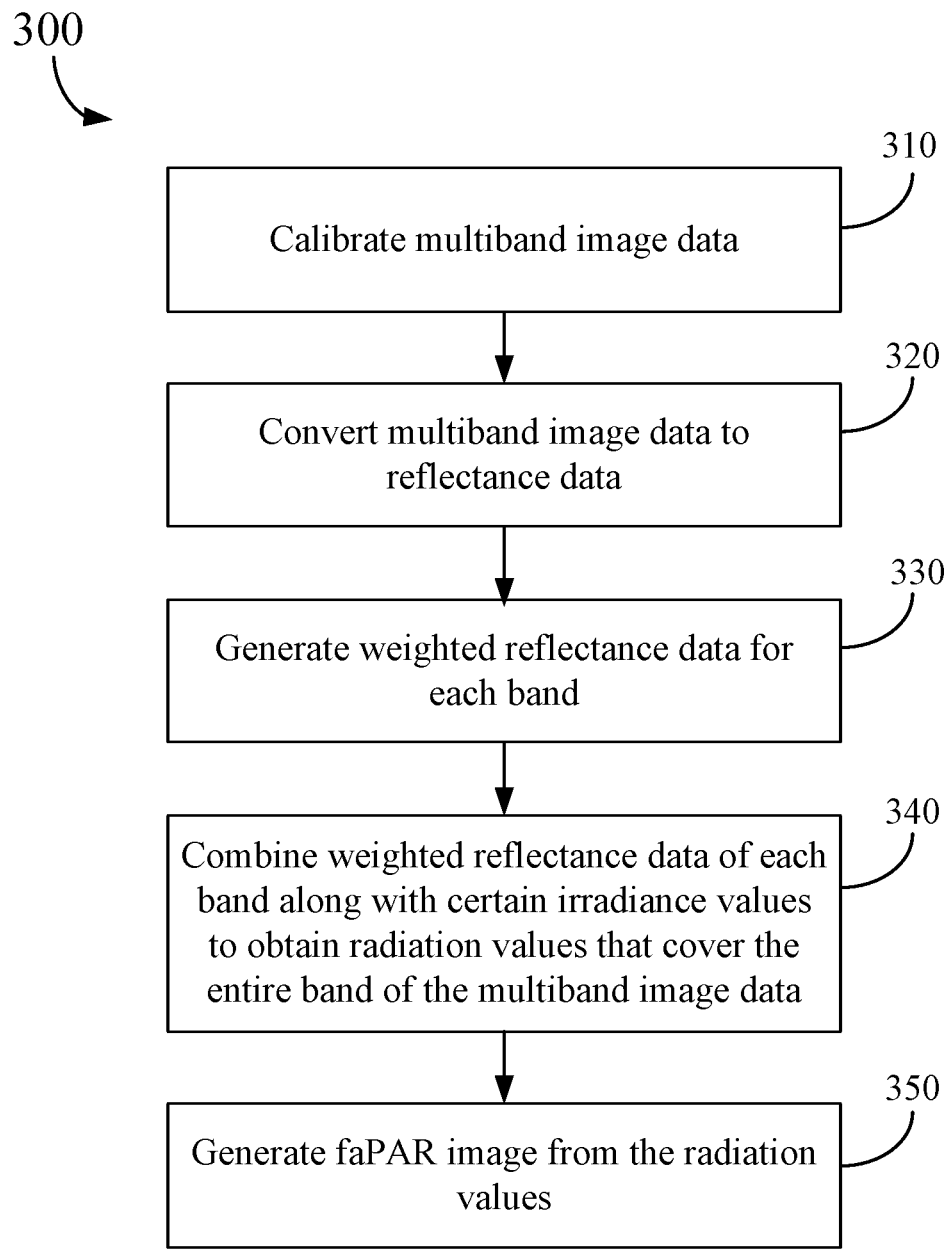
FIG. 3 shows a method for generating a faPAR image using multiband image data from a multi-spectral camera.
Figure 9:
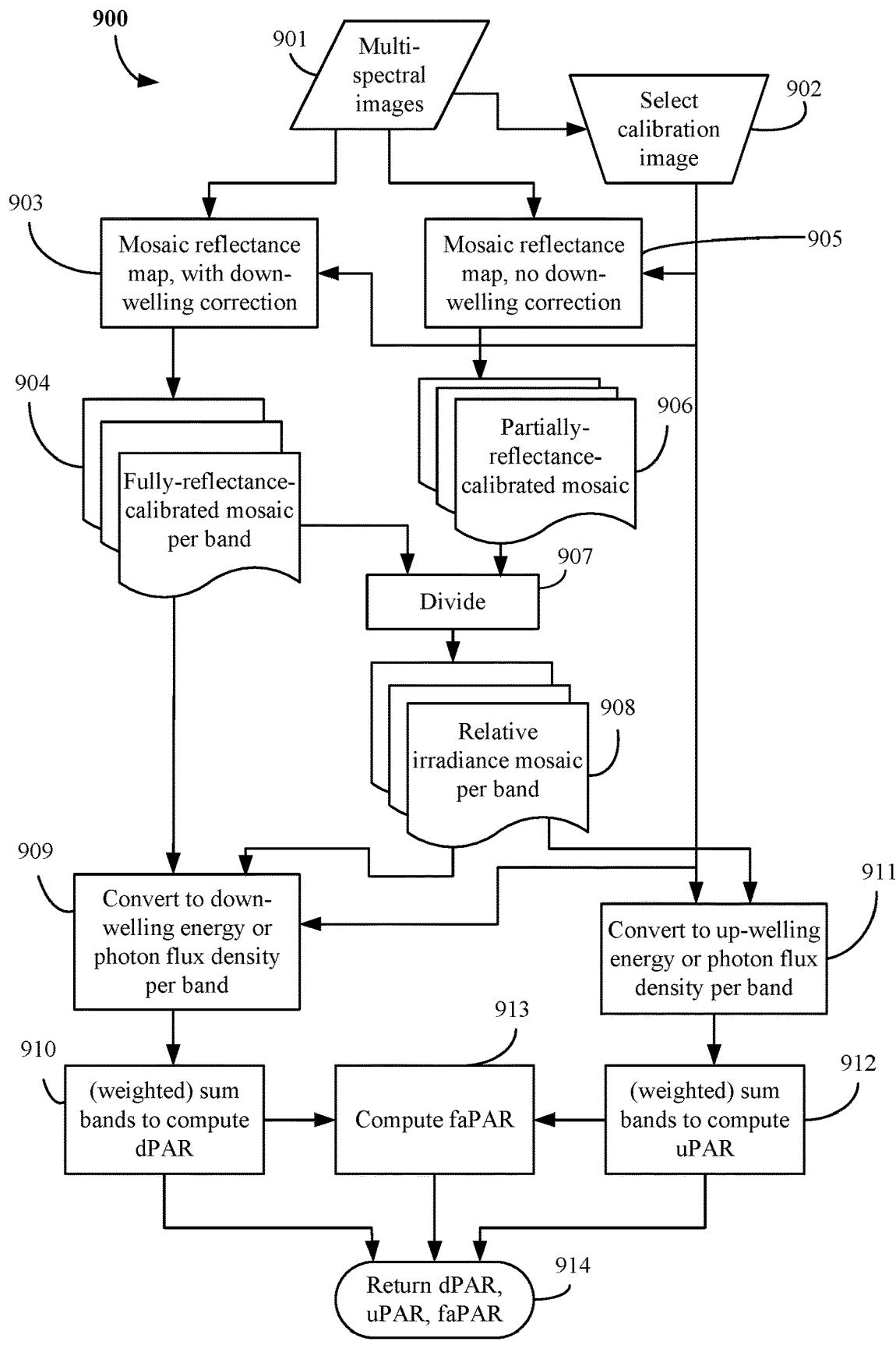
FIG. 9 shows the process of generating PAR images for the experimental example.

An image conversion system is provided that can receive the image data obtained by a remote sensing platform such as described with respect to FIG. 1 and can perform any of the methods for measuring PAR such as described herein, including method 200 described with respect to FIG. 2, method 300 described with respect to FIG. 3, and method 900 described with respect to FIG. 9. The image conversion system can be embodied by any suitable computing system, such as computing system 1000 described with respect to FIG. 10. In some cases, the image conversion system can include a processor that executes the photogrammetry software to stitch together the received images. In some cases, the image conversion system can leverage certain photogrammetry software or other software to convert the image data to reflectance data as will be described in more detail herein. Various images received and generated by the image conversion system can be provided for viewing (e.g., via a viewer), such as described with respect to FIG. 4.

FIG. 2 shows a method for generating a PAR image. Method 200 begins with receiving (210) image data covering the photosynthetic wavelength range of 400-700 nm. The image data is captured by a camera that uses at least one spectral band to cover the 400-700 nm wavelength range. The number of bands, B, imaged in the photosynthetically active spectrum is dependent on the characteristics of the particular camera. B may be indexed according to the number of bands where b∈1 . . . B. In some cases, a single band may be used. In other cases, three bands, such as red, blue, and green, may be used. In yet another case, five or more bands may be used. In the cases in which multiple bands are used, each band corresponds to a limited window in the visible light spectrum. For example, the blue band is in the range of 440-460 nm, so the camera captures the light in that band and assigns a percentage reflectance for each pixel. Similarly, the green band is in the range of 480-520 nm and the camera captures light in that band and assigns a percentage reflectance for each pixel. Likewise, the red band is in the range of 680-720 nm and the camera captures light in that band and assigns a percentage reflectance for each pixel. The reflectance value is composed of multiple reflectance data for each band, which can be converted into energy.

Next, a partial calibration is performed (220) to generate a partially-reflectance-calibrated data using the image data and a calibration image from the calibration object positioned in the region of interest; and a full calibration is performed (230) to generate a fully-reflectance-calibrated data using the image data, the calibration image, and down-welling data from the down-welling light sensor.

The partial calibration can be performed to generate a set of partially-reflectance-calibrated data per band, $p_b$, of the camera. The full calibration can pair the image data from the camera with the data from the down-welling light sensor at each time value for each pixel of image data. The full calibration can be performed to generate a set of fully-reflectance-calibrated data per band, $r_b$, of the camera. The partially-reflectance-calibrated data differs from the fully-reflectance-calibrated according to the relative change in down-welling light intensity from the calibration image.

After generating the set of partially-reflectance-calibrated data and fully-reflectance-calibrated data, several types of PAR images can be generated.

A down-welling PAR (dPAR) image can be generated (240) from at least the partially-reflectance-calibrated data, the fully-reflectance-calibrated data, and the down-welling data corresponding to the calibration image. In some cases, the dPAR image can be generated by calculating a per-band relative irradiance, $\tilde{I}_b$, from the sets of partially-reflectance-calibrated data and fully-reflectance-calibrated data. The value of $\tilde{I}_b$ can be calculated at each pixel location of an image as $\tilde{I}_b = p_b(x,y)/r_b(x,y)$. The per-band relative irradiance, $\tilde{I}_b$, can be used in generating the dPAR image because it relates the partially-reflectance-calibrated data and the fully-reflectance-calibrated data. The dPAR value can then be generated for each pixel location, across all spectral bands represented by the camera, using the formula dPAR$(x,y)=\Sigma_{b=1}^{B} w_b i_b \tilde{I}_b(x,y)$, which accounts for per-band incident light values, $i_b$, from the calibration image and the per-band camera-specific weighting, $w_b$ (described in more detail with respect to FIG. 3). The multiplication of $i_b \tilde{I}_b(x,y)$ scales the relative irradiance into absolute down-welling irradiance energy at each location (x,y). The summation and per-band weighting can generate dPAR values in either photon flux of energy units depending on the choice of weighting factor.

An upwelling PAR (uPAR) image can be generated (250) from at least the partially-reflectance-calibrated data, and the down-welling data corresponding to the calibration image. In some cases, uPAR values can be generated for each pixel location, across all spectral bands represented by the camera, using the formula uPAR$(x,y)=\Sigma_{b=1}^{B} w_b i_b p_b(x,y)$, which accounts for the per-band incident light values, $i_b$, from the calibration image and the per-band camera-specific weighting, $w_b$ (described in more detail with respect to FIG. 3). The multiplication of $i_b p_b(x,y)$ scales the partially-reflectance-calibrated data into absolute up-welling energy at each location (x,y). The summation and per-band weighting can generate uPAR values in either photon flux or energy units depending on the choice of weighting factor.

A fraction-absorbed PAR (faPAR) image can be generated (260) from using a ratio of uPAR to dPAR. For example, faPAR values can be generated for each pixel location, across all spectral bands represented by the camera, using faPAR$(x,y)=1-$uPAR$(x,y)/$dPAR$(x,y)$.

Each of these images (the uPAR, dPAR, and faPAR) are viewable via a viewer supported by the described system (e.g., via a color mapping image representing the corresponding values).

As previously mentioned, in some cases, the camera used to capture images of a region of interest may be a multi-spectral camera capable of capturing image data for multiple bands. Advantageously, a faPAR image can be generated from a multi-spectral camera.

FIG. 3 shows a method for generating a faPAR image using multiband image data from a multi-spectral camera. Referring to FIG. 3, method 300 includes calibrating (310) multiband image data and converting (320) the multiband image data to reflectance data. The calibrating operation 310 generates reflectance-calibrated values for each band of the multiband image data. Calibration can be accomplished using a calibration image, which is an image taken at the region of interest of an object with a known reflectance value (e.g., reflectance calibration object 140 of FIG. 1). The calibration can be performed, for example, by using the photogrammetry software or other software programs. Similarly, the conversion to reflectance data (operation 320) may be performed at least in part by the same or different photogrammetry software or other software program. The calibrating operation may be performed before the converting operation or after the converting operation, depending on implementation. In some cases, in operation 310, partially- and fully-calibrated data can be obtained, such as described with respect to operations 220 and 230 of FIG. 2.

A weighting coefficient, $w_b$, can be assigned (330) to the reflectance data of each band to generate a weighted reflectance data of each band. This weight can be chosen to convert irradiance energy levels from the narrow-bandwidth of each camera band to a proportional value for that band's portion of the photosynthetically active region of the spectrum. That is, the weight assigned to the reflectance data of each band corresponds to a proportional value for that band's portion of a photosynthetically active region of a spectrum of the multiband image data. One method for choosing such value is to use a discrete approximation of the photosynthetically active spectrum given the energy levels of photons at the midpoint of the sensed wavelengths within each band. The weight value can also encompass a conversion from energy units (watts per square meter) to photon flux density (micromoles of photons per square meter per second).

The weighted reflectance data of each band along with certain irradiance values, including downwelling irradiance values, can then be combined (340) to obtain radiation values that cover the entire band of the multiband image data. A faPAR image can be generated (350) from the radiation values. In some cases, operations 240-260 such as described in FIG. 2 may be performed to generate uPAR, dPAR, and faPAR mappings.

PAR images, providing values such as uPAR, dPAR, and faPAR can be viewed by a user. The user can be, for example, a farmer or scientist who requests PAR data for a region of interest.

Figure 4:
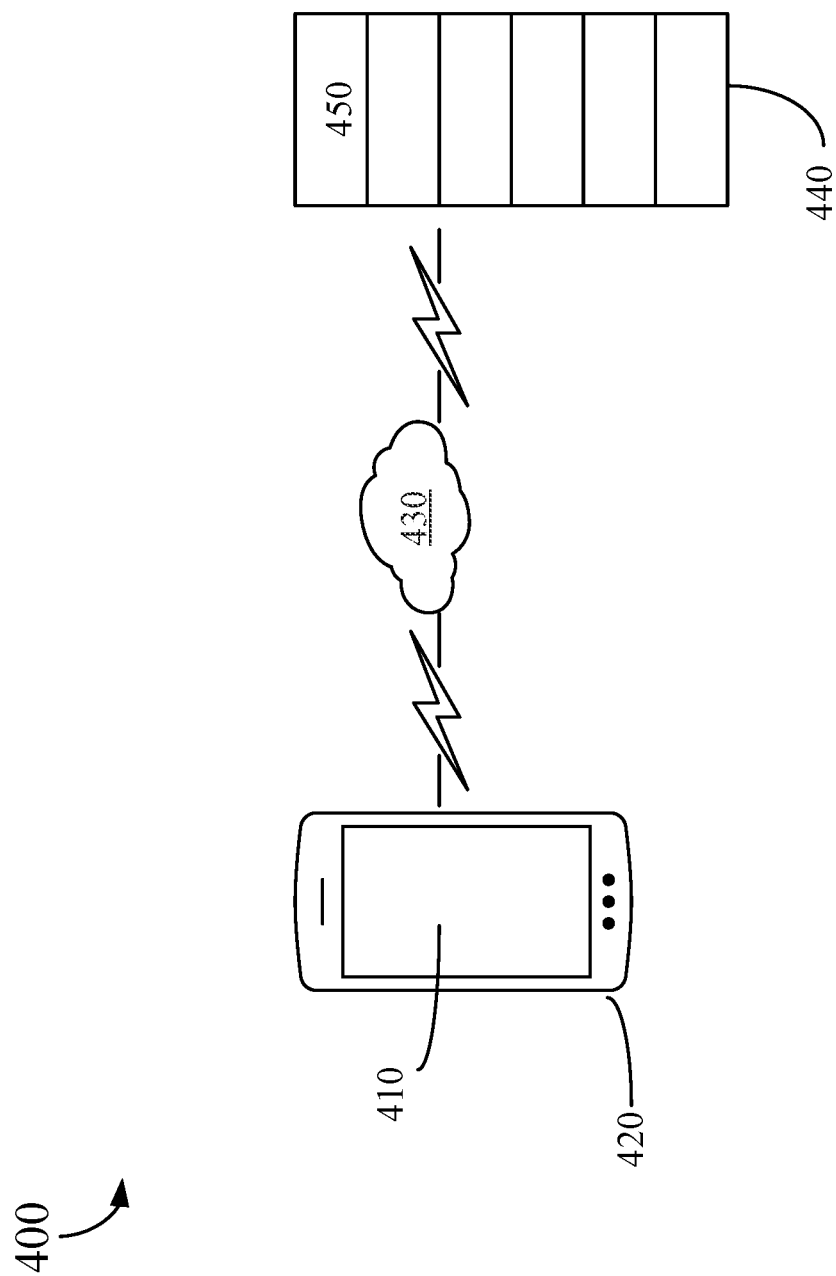
FIG. 4 shows an example implementation of a viewing platform for viewing PAR images.

FIG. 4 shows an example implementation of a viewing environment for viewing PAR images. The viewing environment 400 may include a viewing application 410 installed on a viewing device 420. The viewing device 420 may be connected, via a wired or wireless network connection 430, to a network on which data storage 440 can be accessed. The data storage 440 stores PAR images in locations in memory 450. In some cases, a system such as described with respect to FIG. 10 can generate and store the PAR images and provide access via the viewing application 410. In some cases, viewing application 410 communicates with the data storage 440 via one or more application programming interfaces (and in some cases can request image conversion by an image conversion system such that PAR measurements may be obtained in real-time). A user can access those locations of memory 450 by selecting the desired images on the viewing application 410. The viewing application 410 can be, for example, a web browser, a mobile app, or a desktop app. The viewing device can be, for example, a laptop computer, a desktop computer, or a hand-held mobile device such as a smartphone or tablet, or any other device with an associated display screen capable of displaying PAR images.

The viewing application 410 can include a graphical user interface with menu commands and selector tools. Certain tools can be provided such that a user can select a region within the image to obtain an average value for dPAR, uPAR, and/or faPAR for that region. The application 410 can take the average of PAR image pixel values that are within the selected region and provide the resulting value. In some cases, a user can select to have average values calculated for all the pixels in a selected area or for pixels corresponding to vegetation canopy within the selected area. When the region of interest is just the vegetation within a selected area, the application 410 can identify pixels corresponding to vegetation canopy and provide the average PAR image pixel values for just the pixels corresponding to the vegetation canopy. Any suitable technique for identifying the vegetation canopy from the background or other objects may be used including, but not limited to using shape recognition, using expected ranges for reflectance or PAR values, using user-selected identifiers, or a combination thereof. Accordingly, in response to receiving a selection of a region of interest in an image, the system (e.g., executing instructions from the application 410 or an application that was used to generate the original images) can calculate the average of PAR image pixel values for uPAR, dPAR, and/or faPAR and provide the result.

Figure 5A:
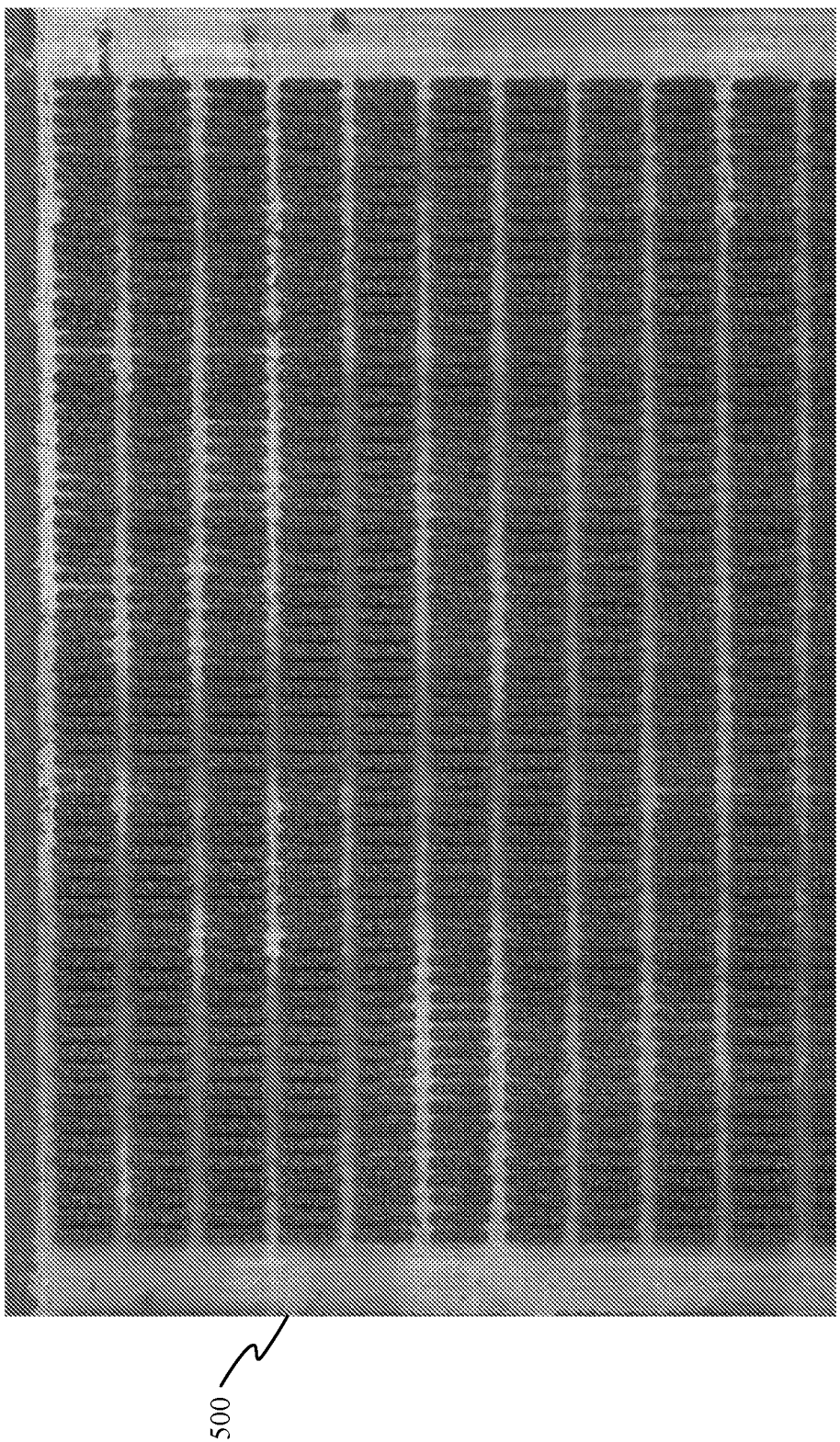
FIG. 5A shows an example image of a field.
Figure 5B:
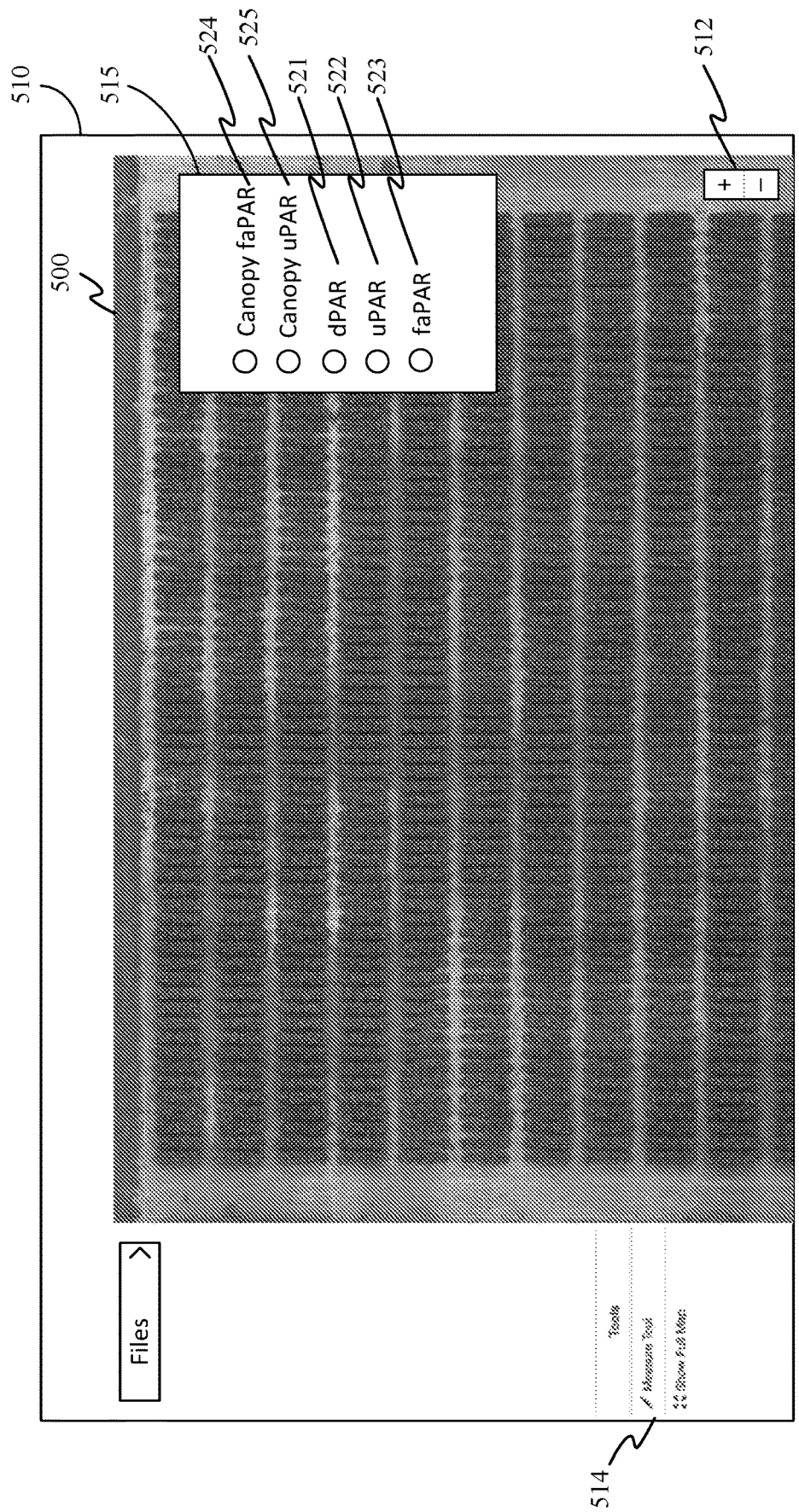
FIG. 5B shows a representative interface of a viewer that can display the image of FIG. 5A.

FIG. 5A shows an example image of a field; and FIG. 5B shows a representative interface of a viewer that can display the image of FIG. 5A. By using a viewer 510 that may be supported by the described system, the image 500 can be viewed as a whole, or zoomed in (e.g., using a zoom tool 512) at a pixel level. The image 500 as a whole may be a stitched together image. The size of each pixel is dependent on the resolution of the specific camera, but the goal is to be able to view plants of interest. For example, a 2 cm by 2 cm square area may correspond to one pixel. From this image, it is possible to view any pixel and, when reflectance values are mapped to each pixel, determine the reflectance value for that pixel. In this case, by viewing the image at a high resolution, scientists can compare the reflectance values of neighboring plants or rows of plants. One useful example may be to compare neighboring plants treated with different fertilizers.

In some cases, additional measurements and calculations can be performed on the image 500. For example, when being displayed via the viewer 510 supported by the described system, certain tools can be provided such that a user can select a region within the image to obtain an average value or other measure (e.g., median, mode, range, tendency, or other statistical measure) for dPAR, uPAR, and/or faPAR for that region. In the illustrated example, a measure tool 514 is provided that enables a user to select a region in the image 500 and obtain a desired calculation (e.g., based on a selected measure of dPAR 521, uPAR 522, or faPAR 523 from menu 515). In some cases, the viewer 510 can differentiate vegetation canopy from other parts of the image and the PAR measurement for regions corresponding to vegetation canopy can be provided (e.g., via selected measure of Canopy faPAR 524 or Canopy uPAR 525).

Figure 6A:
FIG. 6A shows an example of a user view of a dPAR image of a region of interest from FIG. 5A.

FIG. 6A shows an example of a user view of a dPAR image of a region of interest from FIG. 5A. In the case shown, the region of interest is the entire image 500 of FIG. 5A and the dPAR image 600 shows areas of differing energy primarily near the bottom of the image. In the case shown in FIG. 6A, the differences are not extreme and the difference in coloration of the pixels are minimal, which results in the image looking almost like a solid color. The areas of differing energy may be due, for example, to changing environmental conditions like cloud cover or sun angle. The energy available to each plant can be seen in a pixel level view of the dPAR image (and may be labeled such as shown in the example of FIGS. 7A-7D).

Figure 6B:
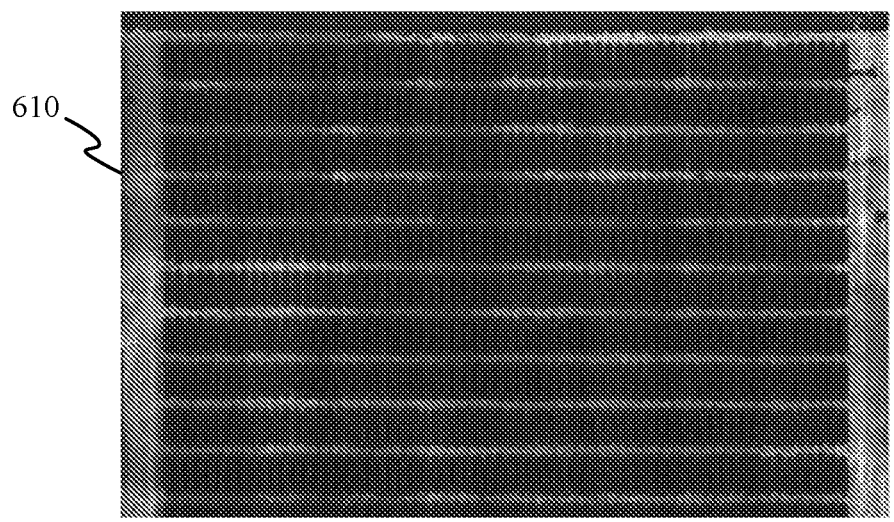
FIG. 6B shows an example of a user view of a uPAR image of the same region of interest as FIG. 6A.

FIG. 6B shows an example of a user view of a uPAR image of the same region of interest as FIG. 6A. The uPAR image 610 shows areas of differing reflective energy. The areas of differing energy may be due, for example, to environmental conditions such as cloud cover or difference in plant photosynthesis due to temperature or time of day or season of the year. This may also be due to the amount of vegetative canopy versus bare ground in the region of interest. The energy reflected by each plant can be seen in a pixel level view of the uPAR image (and may be labeled such as shown in the example of FIGS. 7A-7D).

Figure 6C:
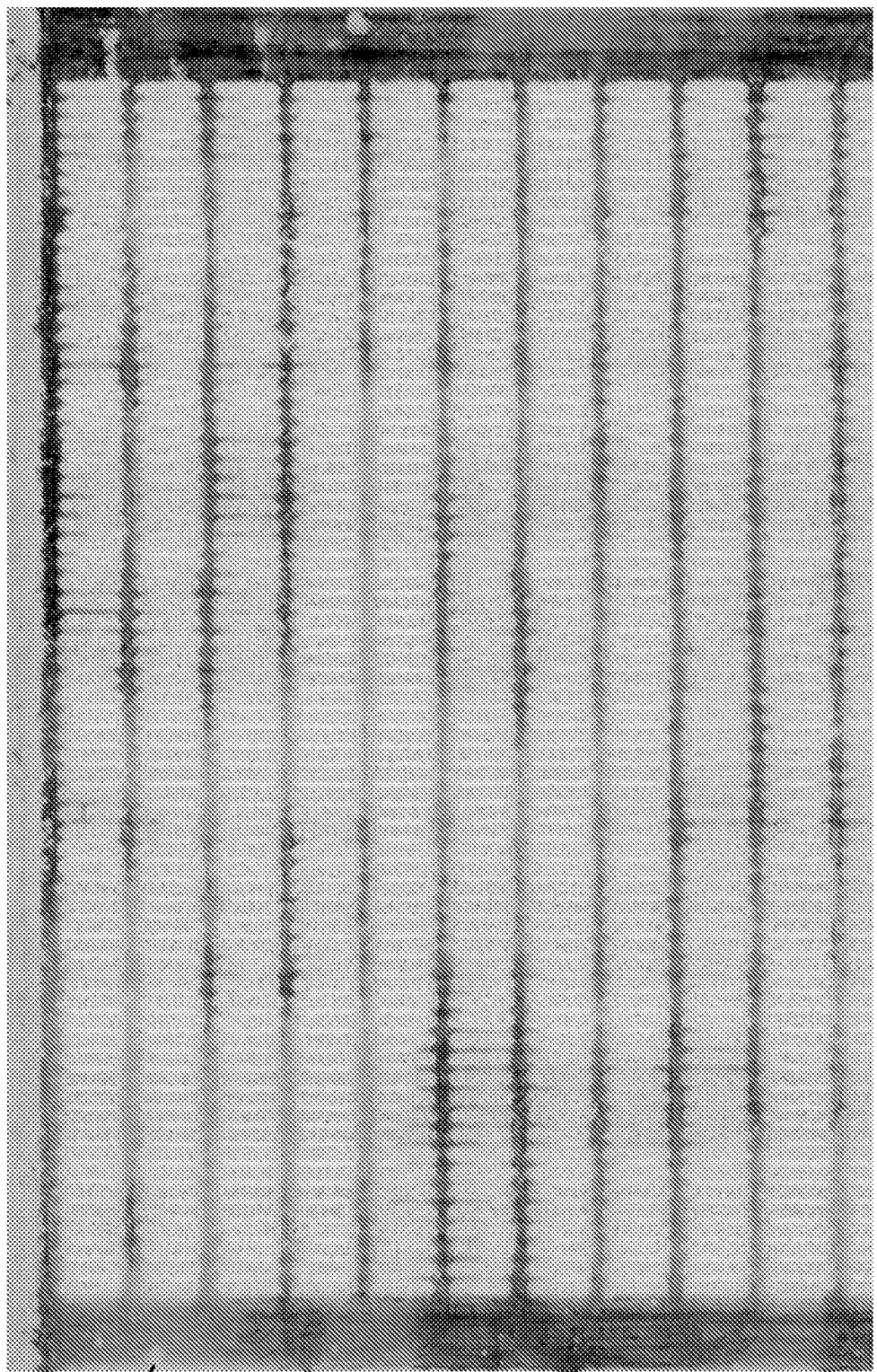
FIG. 6C shows an example of a user view of a faPAR image of the same region of interest as FIG. 6A.

FIG. 6C shows an example of a user view of a faPAR image of the same region of interest as FIG. 6A. The faPAR image 620 shows the amount of energy absorbed versus the amount of energy available. The faPAR image 620 enables the user to see which plants have a higher rate of photosynthesis. This is useful for determining the type of plants in a region of interest or for comparing treatments of plants (such as plants treated with different fertilizers or pesticides or given different soil amendments).

Figure 7A:
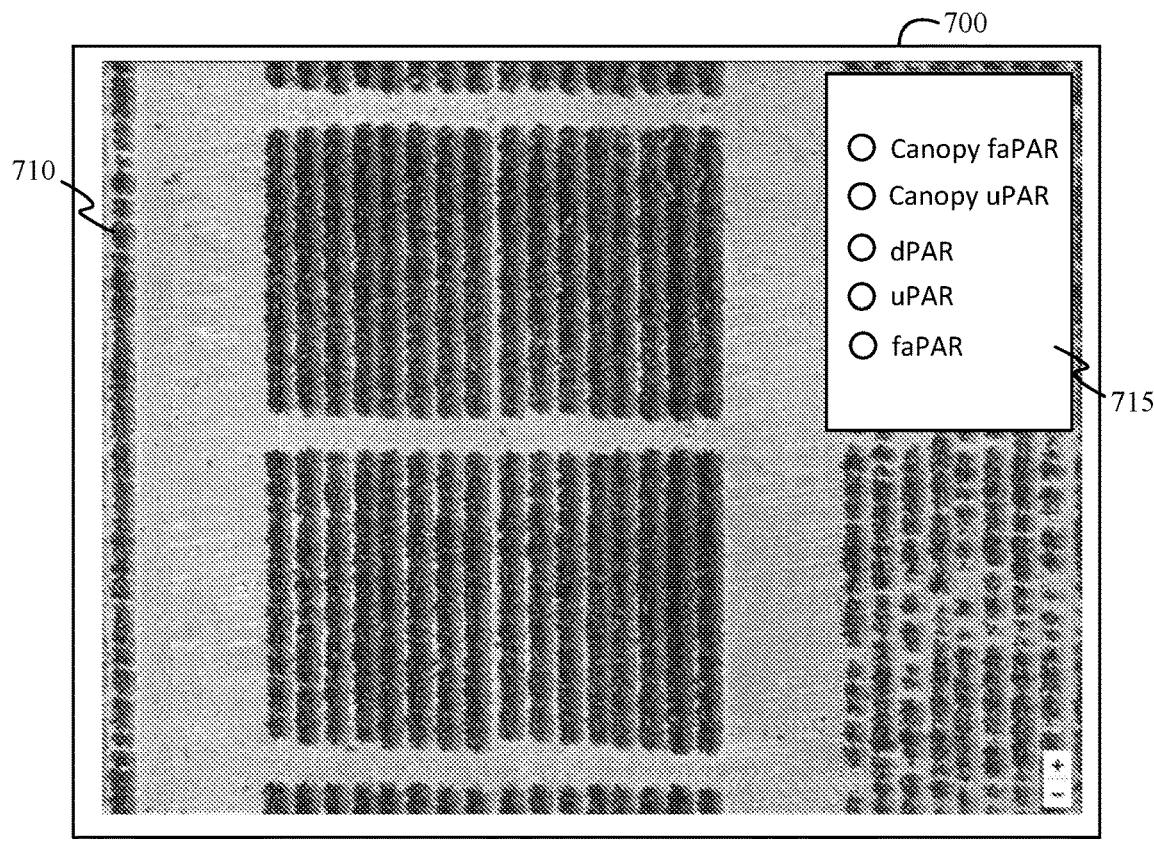
FIGS. 7A-7D illustrate a graphical interface of a viewer providing PAR values.
Figure 7B:
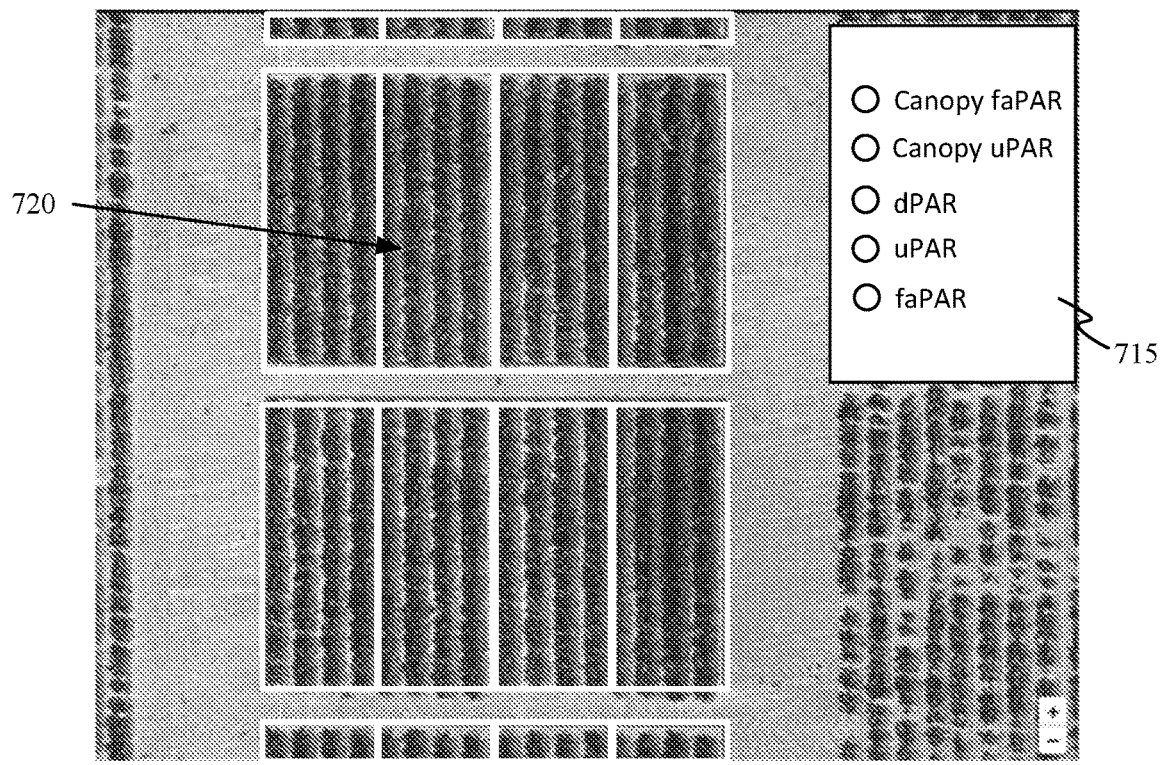
Figure 7C:
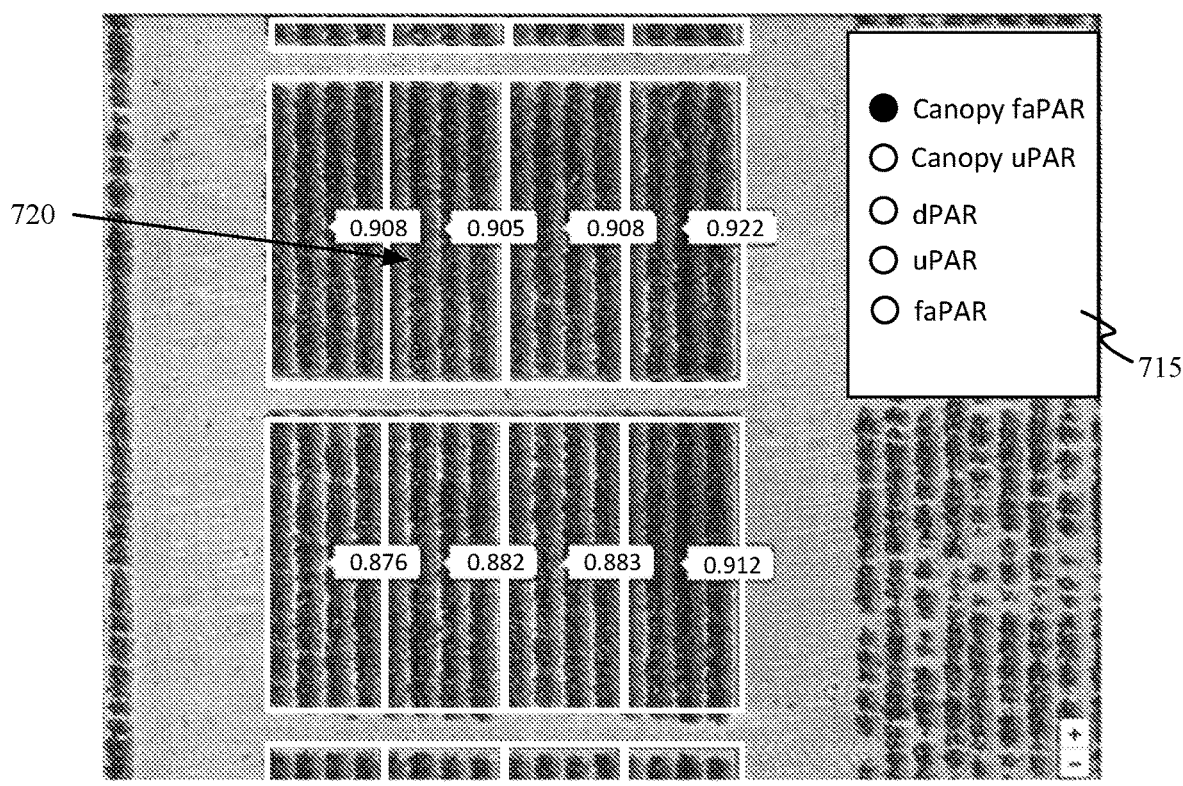
Figure 7D:
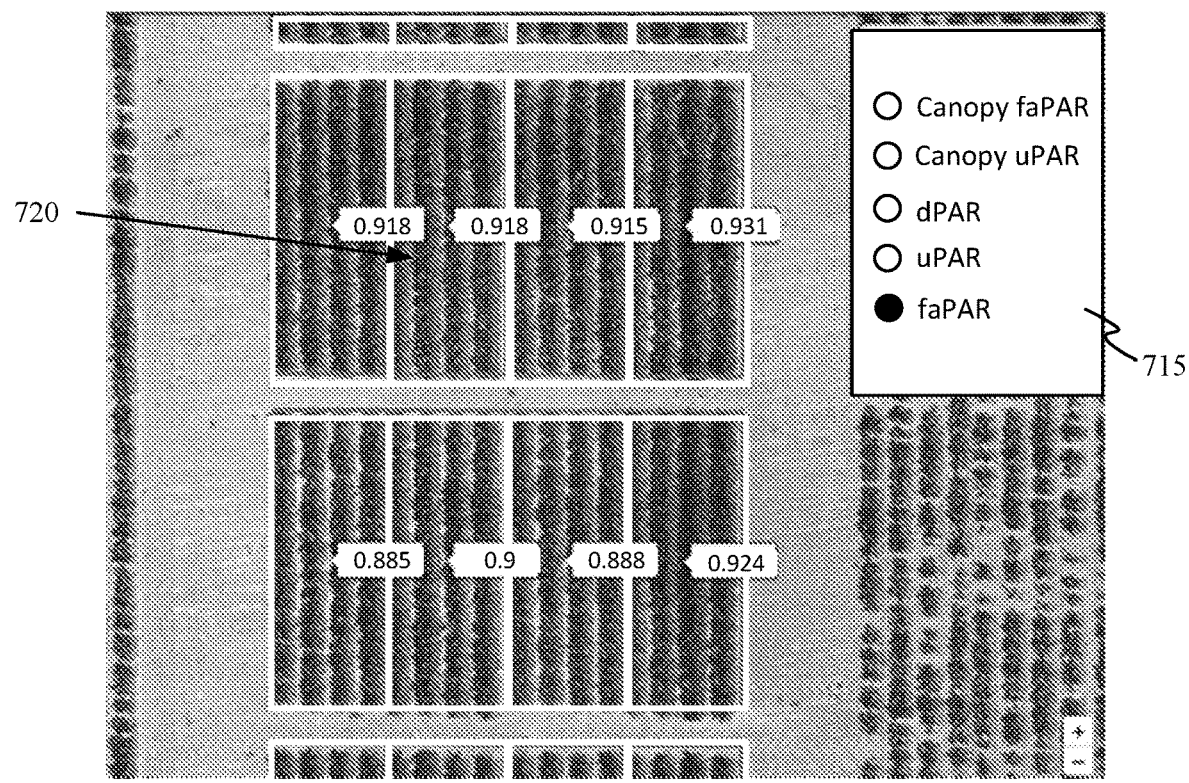

FIGS. 7A-7D illustrate a graphical interface of a viewer providing PAR values. As mentioned above with respect to FIG. 5B, certain tools can be provided such that a user can select a region within an image to obtain an average value for dPAR, uPAR, and/or faPAR for that region. In addition, in some cases, average values can be obtained for specific parts of the selected region (i.e., pixels corresponding to a particular object such as vegetation). Turning first to FIG. 7A, a viewer interface 700 displaying an image 710 with no regions selected is shown. Potential PAR measurements for display can be selected via menu 715. Referring to FIG. 7B, plot regions 720 have been selected. In FIG. 7C, the selected PAR measurement of Canopy faPAR is displayed, showing the faPAR computed from just the vegetation canopy in each plot region 720. In FIG. 7D, the selected PAR measurement of faPAR is displayed, which shows the faPAR computed from all pixels with each plot region.

Figure 8:
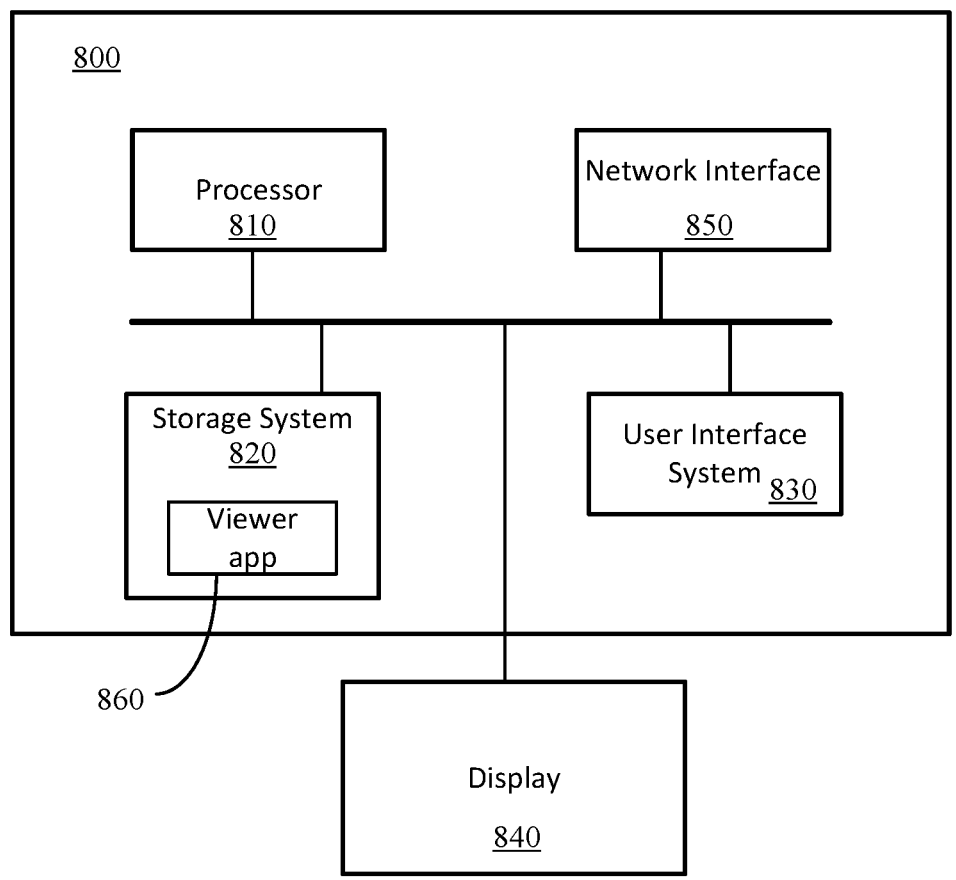
FIG. 8 illustrates an example computing device that may be used to implement a viewer.

FIG. 8 illustrates an example computing device that may be used to implement a viewer. Referring to FIG. 8, a computing device 800 can include a processor 810, storage system 820, user interface system 830, display 840, and network interface 850. The storage system 820 can store instructions for a viewer application 860 (e.g., application 410 of FIG. 4 or web browser, which can be executed by the processor 810. A user can interact with the viewer application 860 via the user interface system 830 and view images and graphical user interfaces via the display 840. The network interface 850 can be used to communicate with other devices, including a storage for PAR images (and/or image conversion system) over a network such as the Internet.

EXAMPLE IMPLEMENTATION

FIG. 9 shows the process of generating PAR images for the example implementation. At the start of the process 900, multi-spectral images 901 are received from a camera at a remote sensing platform. In this example implementation, a three-band camera is used (providing red, green, and blue bands). Out of all of the received multi-spectral images in the region of interest, the calibration object is identified in a single image (per band) and is selected (902) by the system. This image is noted as the calibration image and its corresponding incident light values, $i_b$, are extracted from the image EXIF meta-data and are recorded for later use.

Next, the multi-spectral images are converted (903) into a set of fully-reflectance-calibrated (i.e., with down-welling correction) mosaic images, $r_b$, 904 using Pix4D Mapper photogrammetric software and the chosen calibration image. The "Camera and Sun Irradiance" radiometric processing option is selected to produce the desired full calibration.

The Pix4D Mapper project for the fully-reflectance-calibrated mosaic may be duplicated into a new project. This new project is then edited to use the "Camera Only" radiometric processing option, and new reflectance mosaics are produced (905). This operation 905 produces partially-reflectance-calibrated (i.e., no down-welling correction) mosaics, $p_b$, 906 that match exactly in dimension and mosaicking with the fully-reflectance-calibrated mosaics.

Next, a new per-band relative irradiance mosaic image, $\tilde{I}_b$, is produced by dividing (907) the two reflectance mosaics at each pixel location x,y in the image: $\tilde{I}_b(x,y)=p_b(x,y)/r_b(x,y)$ resulting in per-band relative irradiance mosaics 908.

A down-welling PAR mosaic image is computed (e.g., conversion to down-welling energy or photon flux density per band) where the value at each pixel location x,y is: $dPAR(x,y)=\Sigma_{b=1}^{3}w_b i_b \tilde{I}_b(x,y)$. The intuition of this equation is that, in step 909, for each band, the relative irradiance $\tilde{I}_b(x,y)$ is converted to a full irradiance by the multiplication of the calibration incident light value, $i_b$. Then, in step 910, the full irradiance values are scaled in proportion to that band's contribution to the overall PAR spectrum and converted to the desired unit (photon flux density) by the scaling factor $w_b$, then all weighted bands are summed to compute the final dPAR value (as described with respect to operation 913).

An up-welling PAR mosaic image is computed (e.g., conversion to up-welling energy or photon flux density per band) where the value at each pixel location x,y is: $uPAR(x,y)=\Sigma_{b=1}^{3}w_b i_b p_b(x,y)$. The intuition of this equation is that, in step 911, for each band, the partially calibrated reflectance $r_b(x,y)$, which contains the reflectance factor scaled by the relative down-welling irradiance, is converted to an upwelling radiance amount by the multiplication of the calibration Incident Light Value $i_b$. Then, in step 912, the upwelling irradiance values are scaled in proportion to that band's contribution to the overall PAR spectrum and converted to the desired unit (photon flux density) by the scaling factor $w_b$, then all weighted bands are summed to compute the final uPAR value (as described with respect to operation 913).

Finally, in step 913, faPAR can be computed for each pixel location x,y using: $faPAR(x,y)=1-uPAR(x,y)/dPAR(x,y)$. This quantity is a useful measure of vegetation's photosynthetic processes. The output 914 of the process is mosaic images for uPAR, dPAR, and faPAR.

Images provided in this application were generated using the above example implementation. Energy was collected from a UAV mounted MicSense RedEdge camera with DLS sensor. A calibration object was placed in the imaged scene to provide known reflectance values. PAR values are reported in units of photon flux density, that is, micromoles of photons per square-meter per second. Per-band energy weighting coefficients, $w_b$, for this camera are $w_1=451.40475$, $w_2=561.74813$, $w_3=335.04264$, where bands 1, 2, and 3 correspond to the blue, green, and red bands of the RedEdge camera.

Figure 10:
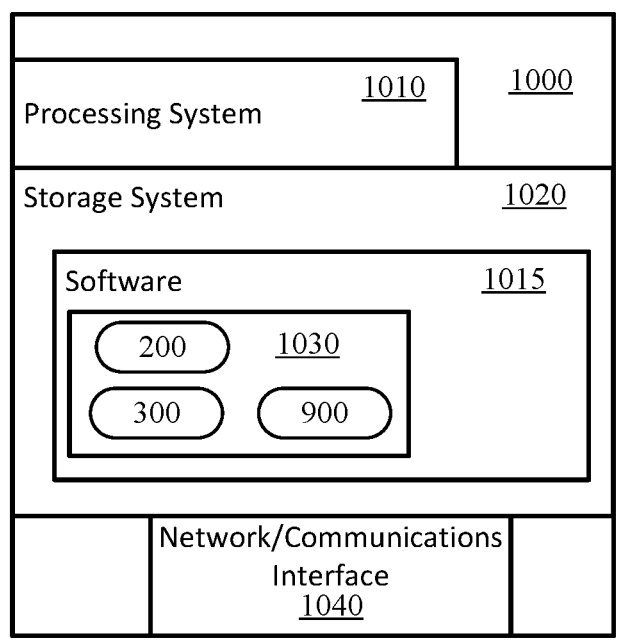
FIG. 10 shows an example computing system that may be used to carry out methods described herein.

FIG. 10 shows an example computing system that may be used to carry out methods described herein. Referring to FIG. 10, system 1000 may be implemented within a single computing device or distributed across multiple computing devices or sub-systems that cooperate in executing program instructions. Accordingly, more or fewer elements described with respect to system 1000 may be incorporated to implement a particular system. The system 1000 can include one or more blade server devices, standalone server devices, personal computers, routers, hubs, switches, bridges, firewall devices, intrusion detection devices, mainframe computers, network-attached storage devices, and other types of computing devices.

In embodiments where the system 1000 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

System 1000 can include processing system 1010 of one or more processors to transform or manipulate data according to the instructions of software 1015 stored on a storage system 1020. Examples of processors of the processing system 1010 include general purpose central processing units (CPUs), graphics processing units (GPUs), field programmable gate arrays (FPGAs), application specific processors, and logic devices, as well as any other type of processing device, combinations, or variations thereof.

Software 1015 can include an operating system and application programs 1030, which may carry out methods 200, 300, 900 such as described with respect to FIGS. 2, 3, and 9. Application programs 1030 may further include software supporting a viewer that can be accessed such as described with respect to FIG. 4.

Storage system 1020 may comprise any suitable computer readable storage media. Storage system 1020 may include volatile and nonvolatile memories, removable and non-removable media implemented in any method or technology for storage of information, such as computer readable instructions, data structures, program modules, or other data. Examples of storage media of storage system 1020 include random access memory, read only memory, magnetic disks, optical disks, CDs, DVDs, flash memory, magnetic cassettes, magnetic tape, magnetic disk storage or other magnetic storage devices, or any other suitable storage media. In no case do storage media consist of transitory, propagating signals.

Storage system 1020 may be implemented as a single storage device but may also be implemented across multiple storage devices or sub-systems co-located or distributed relative to each other. Storage system 1020 may include additional elements, such as a controller, capable of communicating with processing system 1010.

Network interface 1040 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An image conversion system comprising:
   a processing system;
   a storage system;
   a network interface; and
   instructions stored on the storage system that when executed by the processing system perform a method for measuring photosynthetically active radiation (PAR), comprising:
   receiving, via the network interface, image data covering between 400-700 nm wavelengths using at least one spectral band;
   performing, by the processing system, a partial calibration using the image data and a calibration image to generate a partially-reflectance-calibrated data;
   performing, by the processing system, a full calibration using the image data, the calibration image, and down-welling data to generate a fully-reflectance-calibrated data;
   generating, by the processing system, a down-welling PAR (dPAR) image from at least the partially-reflectance-calibrated data and the fully-reflectance-calibrated data;
   generating, by the processing system, an up-welling PAR (uPAR) image from at least the partially-reflectance-calibrated data; and generating, by the processing system, a fraction-absorbed PAR (faPAR) image using a ratio of uPAR to dPAR.

2. The image conversion system of claim 1, wherein the down-welling data is from a down-welling light sensor.

3. The image conversion system of claim 1, wherein the calibration image is an image of an object with a known reflectance value.

4. The image conversion system of claim 1, wherein generating the dPAR image comprises:
calculating dPAR values for each pixel location according to dPAR $(x,y) = \Sigma_1^b w_b i_b \tilde{I}_b(x,y)$,
where (x, y) is a pixel location in an image, b is the at least one spectral band, $\tilde{I}_b$ is a per-band relative irradiance based on the partially-reflectance-calibrated data and the fully-reflectance-calibrated data, $i_b$ is a per-band incident light value from the calibration image, and $w_b$ is a per-band camera-specific weighting.

5. The image conversion system of claim 1, wherein generating the uPAR image comprises:
calculating uPAR values for each pixel location according to uPAR $(x, y) = \Sigma_1^b w_b i_b p_b(x, y)$,
where (x, y) is a pixel location in an image, b is the at least one spectral band, $p_b$ is a partially-reflectance-calibrated data per band, $i_b$ is a per-band incident light value from the calibration image, and $w_b$ is a per-band camera-specific weighting.

6. The image conversion system of claim 1, wherein generating the faPAR image comprises:
calculating faPAR values for each pixel location according to faPAR (x, y)=1−uPAR (x, y)/dPAR(x, y),
where (x, y) is a pixel location in an image,
where dPAR $(x,y) = \Sigma_1^b w_b i_b \tilde{I}_b(x,y)$,
where uPAR $(x,y) = \Sigma_1^b w_b i_b p_b(x, y)$,
where b is the at least one spectral band, $i_b$ is a per-band incident light value from the calibration image, $w_b$ is a per-band camera-specific weighting, $\tilde{I}_b$ is a per-band relative irradiance based on the partially-reflectance-calibrated data and the fully-reflectance-calibrated data, and $p_b$ is a per-band partially-reflectance-calibrated data.

* * * * *